US012577975B2

(12) United States Patent
Limpert et al.

(10) Patent No.: US 12,577,975 B2
(45) Date of Patent: Mar. 17, 2026

(54) FASTENING APPARATUS AND METHOD FOR FASTENING COMPONENTS TO BOLTS

(71) Applicant: ILLINOIS TOOL WORKS INC., Glenview, IL (US)

(72) Inventors: Alexander Limpert, Weikersheim (DE); Oscar Medina Garcia, Bad Mergentheim (DE); Albert Sbongk, Niederstetten (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 570 days.

(21) Appl. No.: 17/992,570

(22) Filed: Nov. 22, 2022

(65) Prior Publication Data

US 2023/0167843 A1 Jun. 1, 2023

(30) Foreign Application Priority Data

Nov. 26, 2021 (DE) ..................... 10 2021 131 141.1
Nov. 8, 2022 (DE) ..................... 10 2022 129 440.4

(51) Int. Cl.
*F16B 41/00* (2006.01)
*F16B 21/02* (2006.01)

(52) U.S. Cl.
CPC ............ *F16B 41/002* (2013.01); *F16B 21/02* (2013.01)

(58) Field of Classification Search
None
See application file for complete search history.

(56) References Cited

U.S. PATENT DOCUMENTS

| | | | | |
|---|---|---|---|---|
| 6,264,393 B1 * | 7/2001 | Kraus | ................... | F16B 5/0657 |
| | | | | 24/297 |
| 7,686,530 B2 * | 3/2010 | Schilz | ................... | F16C 11/069 |
| | | | | 403/329 |
| 9,382,931 B2 * | 7/2016 | Burton | ................. | B60Q 1/2649 |
| 10,851,827 B2 * | 12/2020 | Bohl | ....................... | F16B 41/00 |
| 11,041,520 B2 * | 6/2021 | Sbongk | .............. | B60R 13/0243 |
| 11,312,280 B2 * | 4/2022 | Park | ....................... | B60N 3/046 |
| 2009/0028659 A1 * | 1/2009 | Shibuya | ............... | F16B 21/073 |
| | | | | 411/57.1 |

(Continued)

FOREIGN PATENT DOCUMENTS

| | | | | |
|---|---|---|---|---|
| DE | 102010030964 A1 * | 1/2012 | ............. | F16B 21/04 |
| DE | 102012003337 A1 * | 8/2013 | ............. | F16B 19/00 |

(Continued)

*Primary Examiner* — Matthew R McMahon
(74) *Attorney, Agent, or Firm* — THOMPSON HINE LLP

(57) ABSTRACT

A fastening apparatus is provided for fastening components to bolts or to a bolt arranged on a carrier component. A connecting sleeve delimits a connecting space for receiving a bolt. A cup-shaped retaining cap delimits a receiving space for fastening a component, the connecting sleeve arranged in the receiving space. The retaining cap includes a latching device having at least one latching element, which, in a pre-assembly position, engages with a counter-latching edge of the connecting sleeve such that a displacement of the retaining cap in the axial direction away from the connecting sleeve is blocked, and a securing element with at least one securing tab, which, in the pre-assembly position, is arranged in a securing recess such that a displacement of the retaining cap in the axial direction towards the connecting sleeve is blocked.

12 Claims, 4 Drawing Sheets

(56) References Cited

U.S. PATENT DOCUMENTS

2012/0124792 A1 *   5/2012   Ooki ..................... F16B 5/0642
                                                                   24/606
2013/0125372 A1 *   5/2013   van Niekerk .......... F16B 21/04
                                                                   403/349
2013/0216297 A1 *   8/2013   Albach ................. F16B 21/075
                                                                   403/20

FOREIGN PATENT DOCUMENTS

DE        102017125771  A1 *   5/2019   .............. F16B 21/06
WO     WO-2011096372  A1 *   8/2011   .............. B60Q 1/06
WO     WO-2020046780  A1 *   3/2020   .............. F16B 21/02

* cited by examiner

FASTENING APPARATUS AND METHOD FOR FASTENING COMPONENTS TO BOLTS

TECHNICAL FIELD

The present invention relates to a fastening apparatus as well as a method for fastening components to bolts.

BACKGROUND

DE 10 2010 030 964 A1 shows a fastening assembly for fastening a first motor vehicle component to a second motor vehicle component, comprising at least a first and at least a second fastening element, which are connectable to one another in a positive-locking manner, wherein the second fastening element comprises a spherical bolt and the first fastening element comprises a sleeve, which can span the spherically configured bolt in order to produce a positive lock, and wherein the first fastening element further comprises a securing means for defining the positive-locking interconnected fastening elements. It is provided that this securing means is configured as a cap that is held on the outer housing surface of the sleeve in an axially movable manner, wherein via an axial relative movement of the cap from a defined first position, i.e., a pre-assembly position, into a defined second position, i.e., a final assembly position, the fixing or placement of the sleeve on the spherical bolt can be brought about.

In DE 10 2012 003 337 A1, a fastening apparatus for fastening to a ball-bolt is disclosed. This comprises an inner sleeve that can be spread in a radial direction and can be displaced onto the bolt and comprises an outer sleeve that can be displaced in an axial direction via the inner sleeve into a fastening position, wherein the outer sleeve is releasably fastened to the inner sleeve in the fastening position by means of a latching device.

DE 10 2006 057 557 A1 discloses a ball and socket arrangement, in which a socket housing can be inserted into a receiving opening via an insertion region formed in an outer part, wherein the insertion region has a radially larger cross-section opposite a cross-section of the receiving opening.

WO 2011/096 372 A1 discloses a clip that comprises a receiving opening in which a spherical end portion of an output shaft is receivable.

DE 10 2017 125 771 discloses a vehicle component mount, wherein the vehicle component mount is configured so as to attach a first component to a second component of a vehicle, wherein the mount comprises a first component and a second component, wherein the first component comprises a bolt socket for receiving the head of a ball-bolt or T-bolt of the second component, wherein the second component has a fastening structure for fastening the first component, wherein the first component and the second component are connected to one another in a pre-assembly position via a pre-assembly latching device, from which the first component and the second component can be transferred into a final assembly position by axial displacement with respect to one another, wherein the pre-assembly latching device is configured so as to be detached by introducing the head of the ball-bolt or T-bolt into the bolt socket, so that the axial displacement into the final assembly position is feasible with less effort than when the head of the ball-bolt or T-bolt is not inserted into the bolt pan and/or is not executable at all.

SUMMARY

The problem addressed by the present invention is to provide an alternative to the known fastening apparatuses and methods.

A further problem for the present invention is to provide a fastening apparatus whose parts are secured in their position relative to one another in a transporting or pre-assembly position.

In addition, it is a problem for the present invention to form a fastening apparatus that allows for a lower assembly force and/or a higher retaining force.

Furthermore, a fastening apparatus is to be provided, which can be assembled and disassembled in a simple manner.

According to the present invention, a fastening apparatus is provided for fastening components to bolts or to a bolt arranged on a carrier component. This includes a connecting sleeve delimiting a connecting space, wherein a bolt is capable of being received and fixed in the connecting space in order to connect the fastening apparatus to a bolt, a cup-shaped retaining cap delimiting a receiving space for fastening a component, wherein the connecting sleeve is arranged in the receiving space, and wherein the retaining cap comprises a latching device having at least one latching element, which, in a pre-assembly position, engages with a counter-latching edge of the connecting sleeve such that a displacement of the retaining cap in the axial direction away from the connecting sleeve is blocked, and wherein the retaining cap comprises a securing element with at least one securing tab, which, in the pre-assembly position, is arranged in a securing recess such that a displacement of the retaining cap in the axial direction towards the connecting sleeve is blocked, such that the retaining cap is fixed in an axial direction in a pre-assembly position and is arranged on the connecting sleeve in a loss-proof manner.

In known fastening apparatuses, a final assembly position is usually unintended and easily brought about before a correct placement on the bolt has occurred. If the connecting sleeve and the retaining cap are unintentionally displaced into a final assembly position, this will result in an effort-intensive recovery of the pre-assembly position, or the rejection of the respective fastening apparatus.

Because the retaining cap is engaged with a counter-latching edge of the connecting sleeve by means of the latching element of the latching device in a pre-assembly position, it is not possible to displace the retaining cap in the axial direction away from the connecting sleeve or counter to the direction of assembly.

In the context of the present invention, a direction that extends parallel to an axial direction of a bolt or that is arranged orthogonally to a surface on which the bolt is provided is understood as the assembly direction.

Due to the fact that the retaining cap [comprises] a securing tab of the securing element, which, in the pre-assembly position, is arranged in a securing recess, a displacement of the retaining cap in the axial direction towards the connecting sleeve or in the assembly direction is blocked.

In this way, the retaining cap is fixed in an axial direction in a pre-assembly position and is arranged on the connecting sleeve in a loss-proof manner.

Thus, the parts of the fastening apparatus are secured against displacement and loss both during transport and during assembly. Due to the double connection or the counter-rotating engagement via the latching element and the counter-latching edge, as well as the securing nose and the securing recess in the axial direction, it is also hardly possible to detach the retaining cap from the connecting sleeve under a high amount of force.

In the fastening apparatus according to the invention, the pre-assembly position is thus blocked.

Furthermore, the fastening apparatus can comprise a release element that, when reaching a final assembly position of the connecting sleeve, is actuatable by a bolt such that the retaining cap is displaceable in the axial direction towards the connecting sleeve.

This ensures that the fastening apparatus according to the invention is initially correctly arranged via the connecting sleeve on a bolt and preferably connected thereto, because the retaining cap can only be displaced in the axial direction in the direction of the connecting sleeve after a correct arrangement of the connecting sleeve on a bolt in which the final assembly is achieved.

In this way, assembly verification is simultaneously provided, because this operation ensures a correct arrangement of the fastening apparatus on a bolt.

In the final assembly position, a surface of a bolt can be rearwardly engaged by bolt retaining elements, so that the fastening apparatus is securely and reliably held on a bolt.

The bolt retaining element is configured so as to rearwardly engage surfaces of bolts which face approximately in the assembly direction in order to prevent a displacement of the connecting sleeve or the fastening apparatus 1 counter to the assembly direction in order to thus retain the fastening apparatus on the bolt.

A bolt can be a so-called ball-bolt or T-bolt or also a bolt, which, in an assembly direction, initially comprises a conically widening portion, adjacent thereto a cylindrical portion, and adjacent thereto a conically tapering portion.

Axially aligned with the counter-latching edge, a plurality of latching edges can be integrally formed on the connecting sleeve, wherein the latching element is engaged with a latching edge in a final assembly position.

The latching edges in the final assembly can be supported by a bolt arranged in the connecting space such that a force fit of the retaining force of the fastening apparatus is transferred from the latching element to the latching edge of the connecting sleeve and from there to the bolt.

By supporting the latching edges in the final assembly position by means of a bolt, as soon as the retaining cap is subjected to a force acting counter to the assembly direction, this force is transferred via the latching element to the latching edge of the connecting sleeve and from there to the bolt.

In this way, a high retaining force is provided. The retaining force of the fastening apparatus according to the invention can be up to 400 Newtons or up to 500 Newtons or up to 600 Newtons.

Thus, the final assembly position of the fastening apparatus according to the invention is blocked.

The latching device of the retaining cap can comprise two diametrically opposed latching elements arranged in the receiving space, wherein the connecting sleeve comprises a bolt opening for introducing a bolt into the connecting space, wherein the connecting sleeve comprises the counter-latching edges, which are diametrically opposite to one another, at one of the ends opposite the bolt opening.

By providing two diametrically opposed latching elements that engage the respective counter-latching edges, a blocking of the pre-assembly position is ensured.

The securing element can comprise two latching arms diametrically opposed to one another, which are connected to the retaining cap, wherein, at free ends of the securing arms, two securing tabs are respectively formed, which are arranged in the pre-assembly position in four securing recesses of the connecting sleeve.

By providing four securing tabs and, accordingly, four securing recesses configured correspondingly, it is possible to block the pre-assembly position.

A release element can be arranged on the free ends of the securing arms in the region between the securing tabs, wherein, in the pre-assembly position, the release elements extend through passage grooves into the connecting space of the connecting sleeve, and wherein, upon reaching the final assembly position of the connecting sleeve, the release element is pushable by a bolt out of the passage groove, such that the securing tabs can be brought out of engagement with the securing recesses and the retaining cap can be displaced in the direction of the connecting sleeve.

The passage groove can be delimited by a slanted plane such that the release elements are pushed outward in the radial direction when the retaining cap is displaced in the direction of the connecting sleeve.

In the final assembly position, a surface of a bolt of bolt retaining elements formed on the latching edge retaining arms can be rearwardly engaged such that the fastening apparatus is retained on a bolt.

Due to the fact that the release elements are only pushed outward in the radial direction when a final assembly position is reached and the associated securing tabs can thus be brought out of engagement with the securing recesses, the retaining cap is displaceable towards the connecting sleeve.

Then, the release element can be displaced easily and with relatively low assembly force in the axial direction and the assembly direction, respectively, so that it is possible to quickly achieve the final assembly position of the connecting sleeve and the retaining cap.

By providing a slanted plane in the passage groove, the movement of the release elements during displacement in the axial and assembly direction is simplified and supported, so that the assembly force is reduced and damage to the release elements is safely and reliably prevented.

The latching edges and the passage groove are preferably arranged in a top plan view so as to be offset from one another by 45°.

The retaining cap can comprise a top wall and a radially circumferential side wall, wherein, in the upper wall, a preferably z-shaped passage recess is formed, and wherein a receiving slot is formed in the connecting sleeve in the region of the upper wall, such that a tool, preferably a slotted screwdriver, is insertable into the receiving slot via the passage opening in order to retain the connecting sleeve in a rotationally secure manner by means of a tool, so that, by a rotation rotated of preferably 45° about a longitudinal axis, the latching elements of the retaining cap can be brought out of engagement with the latching edges of the connecting sleeve, such that the retaining cap can be pulled off of the connecting sleeve in the axial direction.

By allowing a tool to be inserted into the receiving slot of the connecting sleeve via the passage recess, the retaining cap can be rotated relative to the connecting sleeve by 45°. In this way, the latching elements of the retaining cap are brought out of engagement with the latching edges of the connecting sleeve. The retaining cap can then be quickly and easily pulled off of the connecting sleeve in the axial direction or counter to the direction of assembly.

Thus, no time-consuming rotating or unscrewing of the retaining cap is necessary. A simple disassembly is carried out by means of a short rotational movement and a subsequent pulling or moving of the retaining cap in the axial direction.

Due to the fact that the passage opening is formed in a Z shape, a tool, in particular a slotted screwdriver, has sufficient space to rotate the retaining cap relative thereto.

The connecting sleeve can comprise latching edge retaining arms on which the latching edges are formed, which are connected to the connecting sleeve in the region of the bolt opening, wherein a recess extending transversely to the axial direction is preferably provided in this connecting region to reduce a return force of the latching edge retaining arms.

By providing latching edge retaining arms, the assembly is significantly simplified, because the latching edge retaining arms are designed so as to be pivotable radially inwardly, and thus a lower assembly force of a maximum of 60 Newtons or 50 Newtons or 40 Newtons or 30 Newtons or 25 Newtons is required in order to mount the fastening apparatus according to the invention.

The recess to the connecting sleeve provided in the application region of the latching edge retaining arms reduces a return force of the latching edge retaining arms, such that this also contributes to a lower assembly force.

The fastening apparatus is configured so as to fasten components having a thickness of 0.5 mm to 8 mm, and preferably of 0.8 mm to 6 mm.

Thus, in application, a highly flexible fastening apparatus is provided, which is suitable for fastening components of different thicknesses. Thus, multiple fastening apparatuses do not need to be provided for different components, because the fastening apparatus according to the invention covers a large range of component thicknesses.

The fastening apparatus can be made from plastic by means of an injection molding process.

In the following, a method according to the invention for fastening a component to a carrier component using the fastening apparatus according to the invention is shown.

In the pre-assembly position, which also represents a transport position, the at least one latching element or latching elements of the retaining cap engage with the counter-latching edge(s) of the connecting sleeve.

In this way, it is not possible to displace the retaining cap in the direction of assembly with respect to the connecting sleeve. Likewise in the pre-assembly position, the securing tabs of the securing arms of the retaining cap engage with the securing recesses of the connecting sleeve so that the retaining cap also cannot be displaced in the assembly direction.

The fastening apparatus is then applied in the assembly direction to a bolt until a head of the bolt or its surface facing in the assembly direction in the connecting space of the connecting sleeve is rearwardly engaged by the bolt retaining element(s) formed on the latching edge arms.

At the same moment or through a corresponding arrangement of the head of a bolt in the region behind the bolt retaining element, the release element(s) are subjected to a radially outward acting force such that the securing tab(s) connected to the release element(s) are brought out of engagement with the securing recess(es).

Due to the fact that a displacement of the retaining cap relative to the connecting sleeve in the assembly direction or in the axial direction is now no longer blocked, the retaining cap can be displaced or pushed in the assembly direction in the axial direction until the retaining cap, and in particular the retaining surface, clamps a component between itself and a surface of the carrier component.

In this final assembly position, the latching element(s) rearwardly engage with the latching edge(s) of the connecting sleeve, and a component is now securely and reliably fixed to a carrier component.

In the following, a method according to the invention is shown for disassembly or for detaching the fastening apparatus.

First, a tool, in particular a slotted screwdriver, is inserted into a receiving slot of the connecting sleeve via the passage opening.

The connecting sleeve is secured against rotation by the insertion of the tool into the receiving slot.

The retaining cap is now rotated in a top plan view by approximately 45°. In this way, the latching elements are brought out of engagement with the corresponding latching edges.

The retaining cap can then simply be detached from the connecting sleeve counter to the assembly direction in the axial direction so that a component fastened with the fastening apparatus can easily be detached or disassembled from a carrier component.

BRIEF DESCRIPTION OF THE DRAWINGS

The fastening apparatus according to the invention is explained in the following on the basis of exemplary embodiments as shown in the figures. The figures show.

DETAILED DESCRIPTION

Figure 1:
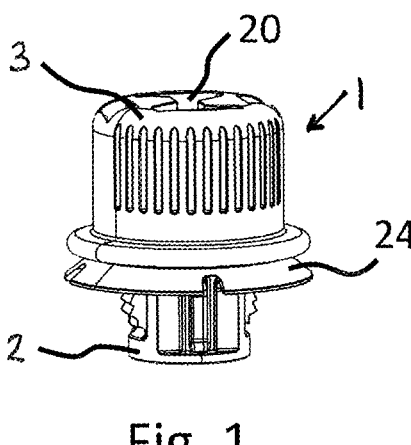
FIG. 1 a perspective view of a fastening apparatus according to the invention.
Figure 2:
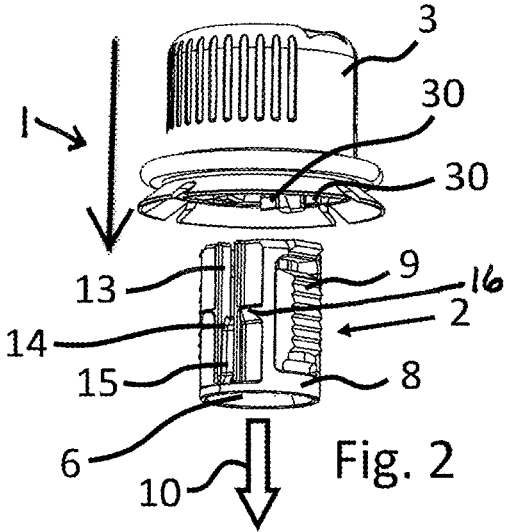
FIG. 2 a perspective exploded view of the fastening apparatus.
Figure 3:
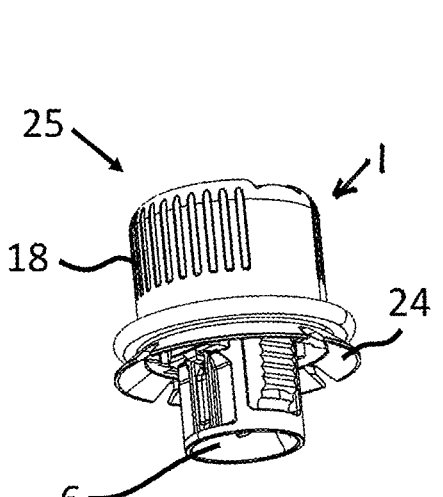
FIG. 3 a perspective view of the fastening apparatus in a pre-assembly position, FIG. 4 a perspective, side-cut view of the fastening apparatus in a pre-assembly position, FIG. 5 a schematic, side-cut view of the fastening apparatus in a pre-assembly position, FIG. 6 a further side-cut perspective view of the fastening apparatus, FIG. 7 a perspective side-cut view of the fastening apparatus with a bolt, FIG. 8 a perspective side-cut view of the fastening apparatus in a state of being arranged on a bolt, FIG. 9 a perspective view of a connecting sleeve of the fastening apparatus, FIG. 10 a perspective view of the fastening apparatus upon transfer from a pre-assembly position into a final assembly position, FIG. 11 a perspective side-cut view of the fastening apparatus in a final assembly position, FIG. 12 a further perspective, side-cut view of the fastening apparatus in a further final assembly position, FIG. 13 a further perspective, side-cut view of the fastening apparatus in a final assembly position, FIG. 14 a perspective side-cut view of the fastening apparatus in a final assembly position with a tool, FIG. 15 a perspective view of the fastening apparatus in a final assembly position, FIG. 16 a perspective view of the fastening apparatus in a rotated state for releasing the fastening apparatus, FIG. 17 a top plan view looking down on the fastening apparatus of FIG. 16, FIG. 18 a side-cut view of the fastening apparatus according to a second exemplary embodiment, FIG. 19 a perspective, partially side-cut view of a third exemplary embodiment of the fastening apparatus.
Figure 4:
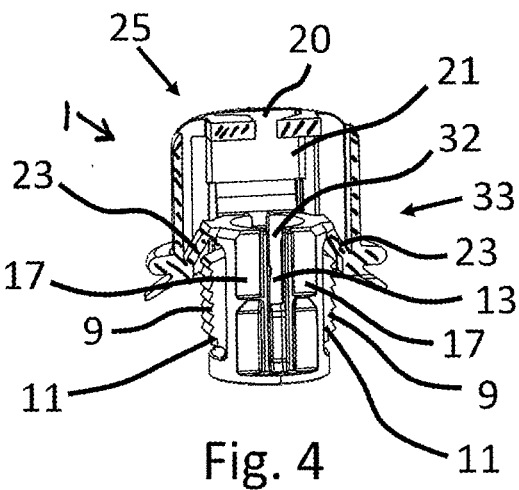
Figure 5:
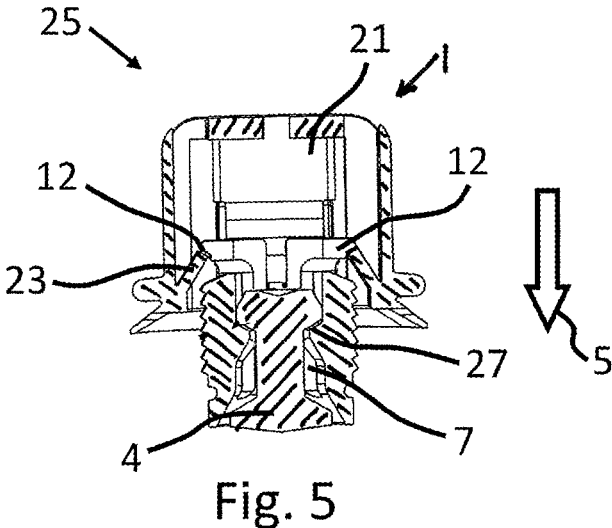
Figure 6:
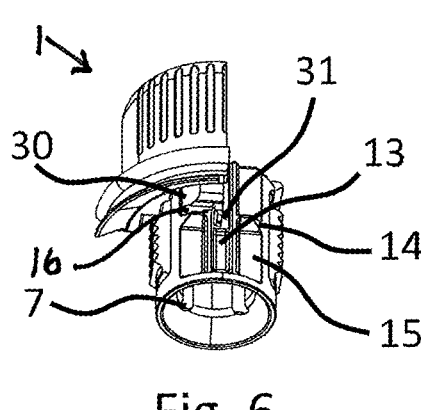
Figure 7:
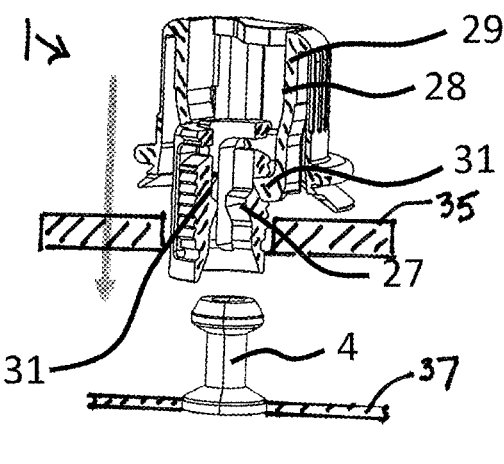
Figure 8:
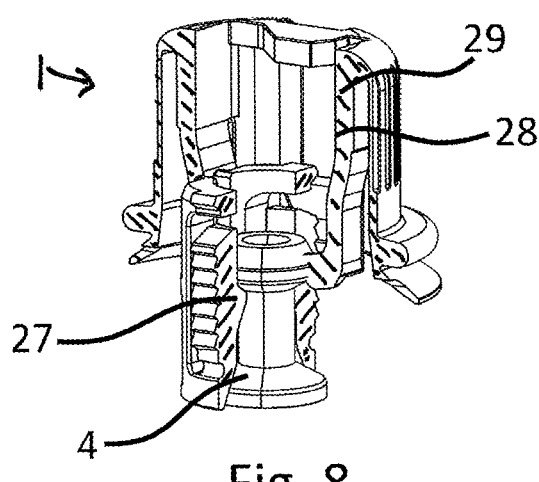
Figure 8:
Figure 9:
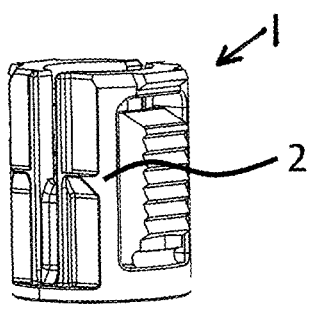
Figure 10:
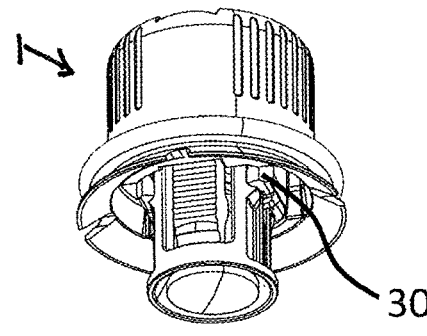
Figure 11:
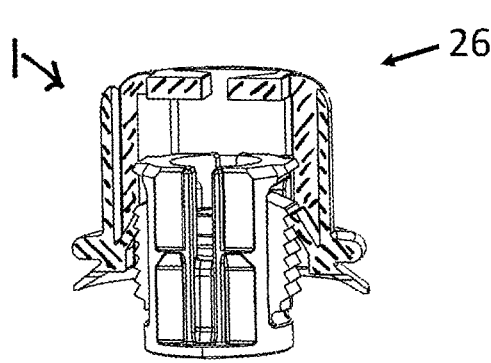
Figure 12:
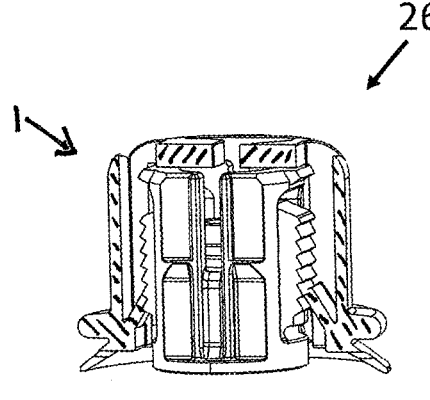
Figure 13:
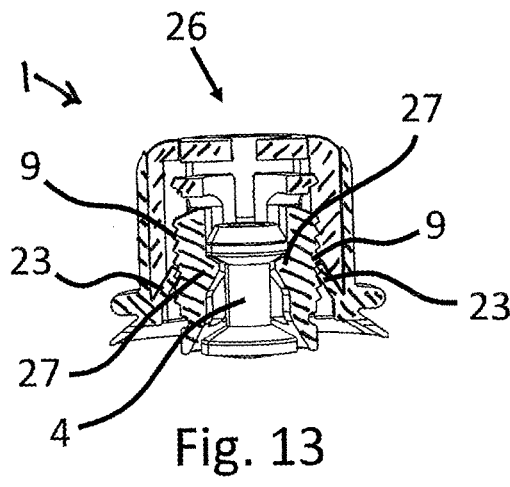
Figure 14:
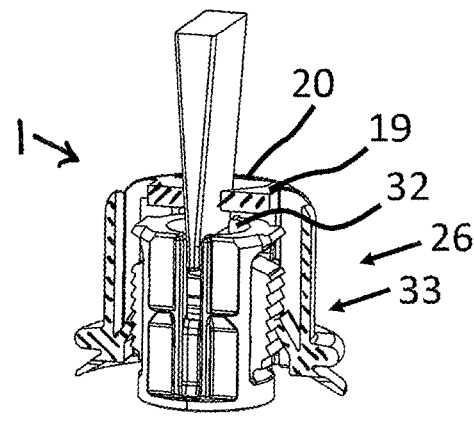
Figure 15:
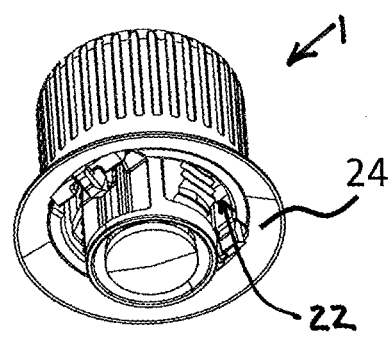
Figure 16:
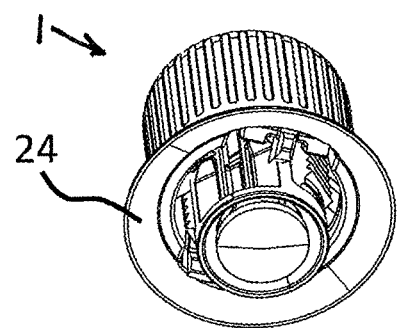
Figure 17:
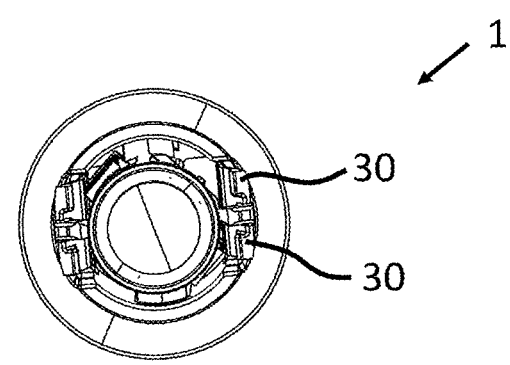

In the following, a fastening apparatus 1 according to the invention is described in further detail on the basis of a first exemplary embodiment (FIGS. 1 to 17). The fastening apparatus 1 comprises a connecting sleeve 2 and a retaining cap 3.

Furthermore, the fastening apparatus 1 is configured so as to secure a component (not shown) to a bolt 4 of a carrier component (not shown) by means of clamps.

Such a bolt 4 can be a known T-bolt or ball-bolt or also a bolt, which, in an assembly direction 5, initially comprises a conically widening portion, adjacent thereto a cylindrical portion, and adjacent thereto a conically tapering portion.

In the context of the present invention, the assembly direction 5 is understood to mean a direction in which the fastening apparatus is guided in the direction of the carrier component and engaged with the bolt 4 in order to fasten a component. The assembly direction 5 extends orthogonally to a surface of a support component, on which such a bolt 4 is arranged.

The connecting sleeve 2 is approximately tubular and has a bolt opening 6 at one end, which opens into a connecting space 7. The connecting space 7 is delimited by the connecting sleeve 2.

In a casing wall 8 of the connecting sleeve 2, latching edge retaining arms 9 are formed. A plurality of latching edges 11 are formed on the latching edge retaining arms 9 in an axial direction 10 so as to be axially flush with one another.

The latching edge retaining arms 9 are arranged diametrically opposite to one another in the casing wall 8.

On an end of the connecting sleeve opposite the bolt opening 6, a respective counter-latching edge 12 is provided so as to be axially flush with the latching edges 11, wherein the two counter-latching edges 12 are also arranged diametrically opposite to one another.

In a top plan view, offset by 45° from the latching edge retaining arms 9 and the counter-latching edges 12, a passage groove 13 extends from the outside through the casing wall 8 of the connecting sleeve 2 into the connecting space 7 up to about half of its height in the axial direction 10 of the connecting sleeve 2.

Approximately centrally in the region of the connecting sleeve 2, the passage groove 13 transitions into a groove 15 via a slanted plane 14 which increases in the assembly direction 5.

In the region of the slanted plane 14, securing recesses 16 are formed on both sides adjacent to the passage groove 13, which comprise a securing surface 17 facing away from the assembly direction 5 and extending orthogonally to the axial direction 10.

At its end opposite the bolt opening 6, the connecting sleeve 2 comprises a receiving slot 32 for receiving a tool.

In addition, a bolt retaining element 27 is respectively formed on the latching edge retaining arms 9 in the connecting space 7. The bolt retaining element 27 is configured so as to rearwardly engage surfaces of bolts which face approximately in the assembly direction 5 in order to prevent a displacement of the connecting sleeve 2 or the fastening apparatus 1 counter to the assembly direction 5 in order to thus retain the fastening apparatus 1 on the bolt.

The retaining cap 3 comprises a radially circumferential side wall 18 and an upper wall 19 arranged counter to the direction of assembly 5. A Z-shaped passage opening 20 is formed in the upper wall 19.

The upper wall 19 and the side wall 18 delimit a receiving space 21.

The connecting sleeve 2 can be inserted into the receiving space 21 of the retaining cap 3 via a receiving opening 22 opposite the upper wall 19.

At an end of the retaining cap 3 positioned at the front in the assembly direction 5 or opposite the upper wall 19, two latching elements 23 are formed so as to be diametrically opposed. The latching elements 23 extend inwardly in a radial direction and are inclined counter to the direction of assembly 5 or in the direction of the upper wall 19.

Furthermore, the retaining cap 3 has a radially circumferential retaining surface 24 in the form of a disc spring in the region of the receiving opening. A component to be fastened between a surface of a carrier component and the retaining surface 24 can be securely and reliably clamped via the retaining surface 24. The fact that the retaining surface is configured in a manner similar to a disk spring can cause a spring force to be applied to a component to be fastened.

The latching elements 23 are engaged with the counter-latching edges 12 in a pre-assembly position 25.

In a final assembly position 26, the latching elements 23 engage with the latching edges 11 of the latching edge retaining arms 9.

In a top plan view, likewise offset by 45°, in the region of the upper wall 19, the securing arms 28, which are diametrically opposed and extend in the assembly direction 5 and in the axial direction 10, respectively, are formed. The securing arms 28 form a securing element 29 with their functional elements.

At the free ends of the securing arms 28, fork-like securing tabs 30 are formed.

In the pre-assembly position 25, the securing tabs 30 engage with the correspondingly formed securing recesses 16 of the connecting sleeve 2.

In the region between the securing tabs 30, release elements 31 are integrally formed on the securing arms 28. The release elements 31 extend through the passage groove 13 of the securing sleeve in the pre-assembly position 25.

In the following, a method according to the invention for fastening a component to a carrier component using the fastening apparatus according to the invention is shown.

In the pre-assembly position 25, which also represents a transport position, the latching elements 23 of the retaining cap 3 engage with the counter-latching edges 12 of the connecting sleeve 2.

In this way, it is not possible to displace the retaining cap 3 in the direction of assembly with respect to the connecting sleeve 2. Likewise in the pre-assembly position 25, the securing tabs 30 of the securing arms 28 of the retaining cap 3 engage with the securing recesses 16 of the connecting sleeve 2 so that the retaining cap 3 also cannot be displaced in the assembly direction 5.

The fastening apparatus is then applied in the assembly direction 5 to a bolt 4 until a head of the bolt or its surface facing in the assembly direction in the connecting space 7 of the connecting sleeve 2 is rearwardly engaged by the bolt retaining elements 27 formed on the latching edge arms 9.

At the same moment or through a corresponding arrangement of the head of a bolt in the region behind the bolt retaining element, the release elements 31 are subjected to a radially outward acting force such that the securing tabs 30 connected to the release elements 31 are brought out of engagement with the securing recesses 16.

Due to the fact that a displacement of the retaining cap 3 relative to the connecting sleeve 2 in the assembly direction 5 or in the axial direction 10 is now no longer blocked, the retaining cap 3 can be displaced or pushed in the assembly direction in the axial direction until the retaining cap 3, and in particular the retaining surface 24, clamps a component 35 between itself and a surface of the carrier component 37.

In this final assembly position 26, the latching elements 23 rearwardly engage with the latching edges 11 of the connecting sleeve 2, and a component is now securely and reliably fixed to a carrier component.

The latching elements form a latching device 33 in conjunction with the latching edges 11 and the counter-latching edges 12, respectively.

In the following, a method according to the invention is shown for disassembly or for detaching the fastening apparatus 1.

First, a tool, in particular a slotted screwdriver, is inserted into a receiving slot 32 of the connecting sleeve 2 via the passage opening 20.

The connecting sleeve 2 is secured against rotation by the insertion of the tool into the receiving slot 32.

The retaining cap 3 is now rotated in a top plan view by approximately 45°. In this way, the latching elements 23 are brought out of engagement with the corresponding latching edges 11.

The retaining cap 3 can then be simply detached from the connecting sleeve 2 counter to the assembly direction 5 in the axial direction 10 so that a component fastened with the fastening apparatus 1 can easily be detached or disassembled from a carrier component.

Furthermore, a fastening apparatus according to a second exemplary embodiment is provided. Unless otherwise described, like components bear the same reference numerals.

Figure 18:
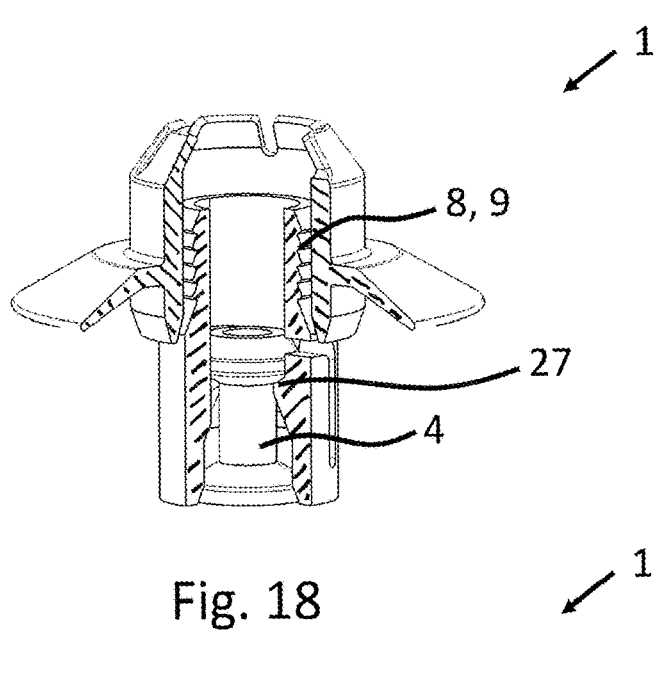

The technical features of the fastening apparatus 1 according to the invention according to the second exemplary embodiment can be found in FIG. 18.

In addition, a fastening apparatus according to the invention is provided according to a third exemplary embodiment. Unless otherwise described, like components bear the same reference numerals.

Figure 19:
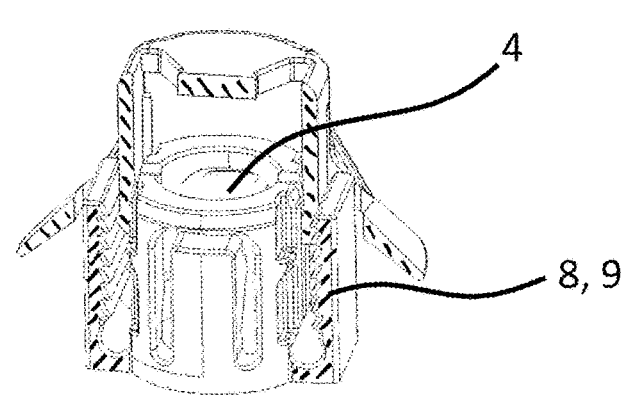
Figure 20:
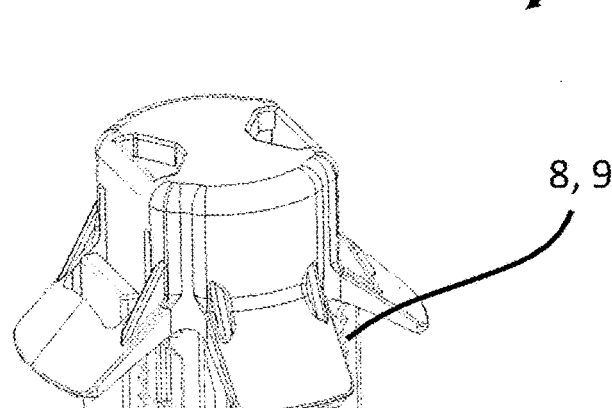
FIG. 20 a perspective view of the fastening apparatus according to the third exemplary embodiment.

The technical features of the fastening apparatus 1 according to the invention according to the third exemplary embodiment can be found in FIGS. 19 and 20.

LIST OF REFERENCE NUMERALS

1 Fastening apparatus
2 Connecting sleeve
3 Retaining cap
4 Bolt
5 Assembly direction
6 Bolt opening
7 Connecting space
8 Casing wall
9 Latching edge retaining arm
10 Axial direction
11 Latching edge
12 Counter-latching edge
13 Passage groove
14 Slanted plane
15 Groove
16 Securing recess
17 Securing surface

18 Side wall
19 Upper wall
20 Passage opening
21 Receiving space
22 Receiving opening
23 Latching element
24 Retaining surface
25 Pre-assembly position
26 Final assembly position
27 Bolt retaining element
28 Securing arm
29 Securing element
30 Securing tabs
31 Release element
32 Receiving slot
33 Latching device

The invention claimed is:

1. A fastening apparatus for fastening components to bolts, comprising:

a connecting sleeve delimiting a connecting space, wherein a bolt is capable of being received and fixed in the connecting space in order to connect the fastening apparatus to a bolt, a cup-shaped retaining cap delimiting a receiving space for fastening a component, wherein the connecting sleeve is arranged in the receiving space, and wherein the retaining cap comprises a latching device having at least one latching element, which, in a pre-assembly position, engages with a counter-latching edge of the connecting sleeve such that a displacement of the retaining cap in an axial direction away from the connecting sleeve is blocked, and wherein the retaining cap comprises a securing element with at least one securing tab, which, in the pre-assembly position, is arranged in a securing recess of the connecting sleeve such that a displacement of the retaining cap in the axial direction towards the connecting sleeve is blocked, such that the retaining cap is fixed in the axial direction in the pre-assembly position and is arranged on the connecting sleeve in a loss-proof manner;

wherein the retaining cap includes a top wall having an inner surface facing the connecting space and the connecting sleeve is positioned adjacent the inner surface when a final assembly position of the connecting sleeve is reached.

2. The fastening apparatus according to claim 1, wherein a release element is provided, which, when the final assembly position of the connecting sleeve is reached, is actuatable by a bolt such that the retaining cap is displaceable in the axial direction towards the connecting sleeve.

3. The fastening apparatus according to claim 1, wherein a plurality of latching edges are formed on the connecting sleeve, axially aligned so as to be flush with the counter-latching edge, wherein, in the final assembly position, the latching element engages with a latching edge, and wherein, in the final assembly position, the latching edges are supported by a bolt arranged in the connecting space such that a flow of the retaining force of the fastening apparatus is transferred from the latching element to the latching edge of the connecting sleeve and from there to the bolt.

4. The fastening apparatus according to claim 3, wherein the retaining cap comprises the top wall and a radially circumferential side wall, wherein, in the top wall, a passage recess is formed, and wherein a receiving slot is formed in the connecting sleeve in the region of the top wall, such that a tool is insertable into the receiving slot via the passage opening in order to retain the connecting sleeve in a rotationally secure manner by means of the tool, so that, by a rotation of 45° about a longitudinal axis, the latching elements of the retaining cap can be brought out of engagement with the latching edges of the connecting sleeve, such that the retaining cap can be pulled off of the connecting sleeve in the axial direction.

5. The fastening apparatus according to claim 3, wherein the connecting sleeve comprises latching edge retaining arms on which the latching edges are formed, which are connected to the connecting sleeve in the region of the bolt opening, wherein a recess extending transversely to the axial direction is provided in this connecting region to reduce a return force of the latching edge retaining arms.

6. The fastening apparatus according to claim 1, wherein the latching device of the retaining cap comprises two diametrically opposed latching elements arranged in the receiving space, and wherein the connecting sleeve comprises a bolt opening for introducing a bolt into the connecting space, wherein the connecting sleeve comprises counter-latching edges diametrically opposite to one another at an end opposite to the bolt opening.

7. The fastening apparatus according to claim 1, wherein the securing element comprises two latching arms diametrically opposed to one another, which are connected to the retaining cap, wherein, at free ends of the latching arms, two securing tabs are respectively formed, which are arranged in the pre-assembly position in four securing recesses of the connecting sleeve.

8. The fastening apparatus according to claim 5, wherein a release element is arranged at the free end of each latching arm in the region between the securing tabs, wherein, in the pre-assembly position, the release elements extend through passage grooves into the connecting space of the connecting sleeve, and wherein, upon reaching the final assembly position of the connecting sleeve, the release element is pushable by a bolt out of the passage groove such that the securing tabs can be brought out of engagement with the securing recesses and the retaining cap can be displaced towards the connecting sleeve, wherein the passage groove is delimited by a slanted plane such that the release elements are pushed radially outwards in the direction of the connecting sleeve when the retaining cap is displaced, wherein, in the final assembly position, a surface of the bolt can be rearwardly grasped by bolt retaining elements formed on a pair of latching edge retaining arms, such that the fastening apparatus is held to the bolt.

9. The fastening apparatus of claim 1, wherein, in the pre-assembly position, the at least one securing tab is located externally of the connecting space.

10. A method of fastening a component to a carrier component with a fastening apparatus according to claim 1, comprising the following steps:

providing the fastening apparatus in a pre-assembly position, wherein at least one latching element of a retaining cap is engaged with at least one counter-latching edge of a connecting sleeve, and wherein at least one securing tab of a securing arm of the retaining cap is engaged with at least one securing recess of the connecting sleeve, applying the fastening apparatus in an assembly direction to a bolt until a surface of the bolt is in a connecting space of the connecting sleeve, said surface facing in the assembly direction, is rearwardly engaged by at least one bolt retaining element formed on a latching edge retaining arm, and wherein through a corresponding arrangement of a head of the bolt in the region behind the bolt retaining element, a release element is subjected to a radially outward acting force such that the securing tabs connected to the release element are brought out of engagement with the securing recess, displacing the retaining cap relative to the connecting sleeve in the assembly direction until the retaining cap and a retaining surface clamp a component between themselves and a surface of the carrier component, and rearwardly engaging a latching edge of the connecting sleeve by the latching element of the retaining cap such that the component is fixed to the carrier component in the final assembly position.

11. A method for disassembling a fastening apparatus according to claim 1, comprising the following steps:

introducing a tool through a passage opening into a receiving slot of a connecting sleeve, wherein the connecting sleeve is secured against rotation by the insertion of the tool into the receiving slot, rotating a retaining cap in a top plan view by about 45° such that at least one latching element is brought out of engagement with a corresponding latching edge, and detaching the retaining cap from the connecting sleeve counter to an assembly direction so that a component fastened with the fastening apparatus can easily be detached or disassembled from a carrier component.

12. A fastening apparatus for fastening components to bolts, comprising:

a connecting sleeve delimiting a connecting space, wherein a bolt is capable of being received and fixed in the connecting space in order to connect the fastening apparatus to a bolt, a cup-shaped retaining cap delimiting a receiving space for fastening a component, wherein the connecting sleeve is arranged in the receiving space, and wherein the retaining cap comprises a latching device having at least one latching element, which, in a pre-assembly position, engages with a counter-latching edge of the connecting sleeve such that a displacement of the retaining cap in an axial direction away from the connecting sleeve is blocked, and wherein the retaining cap comprises a securing element with at least one securing tab, which, in the pre-assembly position, is arranged in a securing recess such that a displacement of the retaining cap in the axial direction towards the connecting sleeve is blocked, such that the retaining cap is fixed in the axial direction in the pre-assembly position and is arranged on the connecting sleeve in a loss-proof manner;

wherein a plurality of latching edges are formed on the connecting sleeve;

wherein the retaining cap comprises a top wall and a radially circumferential side wall, wherein, in the top wall, a z-shaped passage recess is formed, and wherein a receiving slot is formed in the connecting sleeve in the region of the top wall, such that a tool is insertable into the receiving slot via the passage opening in order to retain the connecting sleeve in a rotationally secure manner by means of the tool, so that, by a rotation of 45° about a longitudinal axis, the latching elements of the retaining cap can be brought out of engagement with the latching edges of the connecting sleeve, such that the retaining cap can be pulled off of the connecting sleeve in the axial direction.

\* \* \* \* \*